United States Patent
Ramirez, Jr.

(10) Patent No.: US 11,370,495 B2
(45) Date of Patent: Jun. 28, 2022

(54) RETRACTABLE CANOPY ASSEMBLIES AND PICKUP TRUCKS HAVING THE SAME

(71) Applicant: Toyota Motor Engineering & Manufacturing North America, Inc., Plano, TX (US)

(72) Inventor: Ruben Ramirez, Jr., Jourdanton, TX (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 197 days.

(21) Appl. No.: 16/811,807

(22) Filed: Mar. 6, 2020

(65) Prior Publication Data

US 2021/0276632 A1 Sep. 9, 2021

(51) Int. Cl.
*B62D 33/04* (2006.01)
*B62D 33/023* (2006.01)

(52) U.S. Cl.
CPC .......... *B62D 33/04* (2013.01); *B62D 33/023* (2013.01)

(58) Field of Classification Search
CPC ...... B62D 31/00; B62D 31/006; B62D 33/04; B62D 33/023; B60P 3/341; B60P 3/343; B60R 11/00; E04H 15/06
USPC ......... 296/100.7, 37.1, 37.6, 163; 135/88.03, 135/115
See application file for complete search history.

(56) References Cited

U.S. PATENT DOCUMENTS

| | | | |
|---|---|---|---|
| 4,603,901 A * | 8/1986 | McIntosh | B60P 3/34 296/165 |
| 5,820,189 A | 10/1998 | Tew | |
| 6,202,664 B1 | 3/2001 | Shenton, Jr. et al. | |
| 7,059,660 B1 | 6/2006 | Juola | |
| 7,520,290 B2 | 4/2009 | Dalbo | |
| 8,225,807 B1 | 7/2012 | Cain | |
| 9,010,837 B2 | 4/2015 | Mulholland et al. | |
| 10,494,037 B2 * | 12/2019 | Williams | B60P 7/08 |
| 2003/0127875 A1 | 7/2003 | Hornick | |
| 2007/0267885 A1 * | 11/2007 | Thelen | B60R 9/00 296/37.6 |
| 2013/0048237 A1 | 2/2013 | Mathews | |
| 2016/0251872 A1* | 9/2016 | Tucker | E04H 15/08 135/88.01 |

(Continued)

FOREIGN PATENT DOCUMENTS

AU 2019100949 A4 * 10/2019
GB 2280876 A 2/1995

*Primary Examiner* — Joseph D. Pape
*Assistant Examiner* — Neronica Marie Shull
(74) *Attorney, Agent, or Firm* — Dinsmore & Shohl LLP

(57) ABSTRACT

A canopy assembly includes a truck bed and a pair of retractable canopies. The truck bed includes a floor and a pair of spaced apart sidewalls. Each of the pair of sidewalls includes an exterior wall, an opposite interior wall, and an elongated cavity positioned between the exterior wall and the interior wall of each of the pair of sidewalls. The pair of retractable canopies are movable between a stored and use positions. In the stored position, each of the retractable canopies are positioned within the elongated cavity defined in each of the pair of sidewalls. In the use position, each of the pair of retractable canopies are positioned to extended at least partially outside of the elongated cavity of each of the pair of sidewalls and extend beyond the exterior wall of the sidewalls in a vehicle lateral direction.

13 Claims, 3 Drawing Sheets

(56) References Cited

U.S. PATENT DOCUMENTS

2021/0332606 A1\* 10/2021 Cullen .................... B60R 11/00

\* cited by examiner

RETRACTABLE CANOPY ASSEMBLIES AND PICKUP TRUCKS HAVING THE SAME

TECHNICAL FIELD

The present specification generally relates to pickup truck beds and, more specifically, to truck bed retractable canopy assemblies for pickup trucks.

BACKGROUND

Portable canopy assemblies are known. These portable canopy assemblies are generally standalone requiring a pole at each corner to support the canopy. The poles may be anchored into the ground and thus require to be spaced apart from other objects. Further, the portable canopy assemblies are cumbersome to store when not in use and are time consuming to erect.

Accordingly, there is a need for retractable canopy assemblies that are integrated with the truck bed eliminating the need for remote storage, time to erect, and require less space when erected.

SUMMARY

In accordance with one embodiment, a canopy assembly is provided. The canopy assembly includes a truck bed and a pair of retractable canopies. The truck bed includes a floor and a pair of spaced apart sidewalls. Each of the pair of sidewalls includes an exterior wall, an opposite interior wall, and an elongated cavity positioned between the exterior wall and the interior wall of each of the pair of sidewalls. The pair of retractable canopies are movable between a stored position and a use position. In the stored position, each of the retractable canopies are positioned within the elongated cavity defined in each of the pair of sidewalls. In the use position, each of the pair of retractable canopies are positioned to extend at least partially outside of the elongated cavity of each of the pair of sidewalls and extend beyond the exterior wall of the respective sidewalls in a vehicle lateral direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. The truck bed is included in a retractable canopy assembly utilized to provide shade to an adjacent area of the truck bed. The truck bed includes a floor and a pair of sidewalls. Each of the pair of sidewalls has an exterior wall and an opposite interior wall. The sidewalls each have an upper end that extends between the exterior wall and the interior wall. A lid is movably coupled to the upper end of each of the pair of sidewalls. The lid is movable between a closed position and an open position. A lid actuator may be coupled to each lid to move the lid between the open and closed positions. The exterior wall of each of the sidewalls of the truck bed includes an inner surface and an opposite outer surface, and the interior wall of each of the sidewalls of the truck bed includes an inner surface and an opposite outer surface. An elongated cavity is defined between the inner surface of the interior wall and the inner surface of the exterior wall of each of the sidewalls.

The retractable canopy assembly is movable between a stored position and a use position. The retractable canopy assembly also includes a pair of lower legs, a pair of extendable legs, a canopy, and a foldable leg. Each retractable canopy assembly is received within each of the elongated cavities when in the stored position. Each extendable leg is linearly movable between an extended position and a retracted position. The canopy is movable between a rolled position and an unrolled position. The foldable leg is movable between a folded position and an unfolded position. In the stored position, the extendable leg is in the retracted position, the canopy is in the rolled position and the foldable leg is in the folded position. In the use position, the extendable leg is in the extended position, the canopy is in the unrolled position and the foldable leg is in the unfolded position.

The extendable legs extend at least partially outside the elongated cavities, beyond the upper ends when in the extended position. As the retractable canopy assemblies are stored within the sidewalls of the truck bed when in the retracted position, there is no longer a need to store canopy assemblies remotely and are readily available to provide shade to adjacent areas of the truck bed upon movement into the use position.

In some embodiments, the retractable canopy assembly may include an actuator provided for each of the pair of extendable legs. The actuators are actuated to move the pair of extendable legs between the retracted position and the extended position. The actuators may be actuated by a switch located on the pickup truck or by a remote device such as a key fob, smartphone or another mobile computer device.

Various embodiments of a retractable canopy assembly and pickup trucks having such canopy assemblies will be described in more detail herein.

Figure 1:
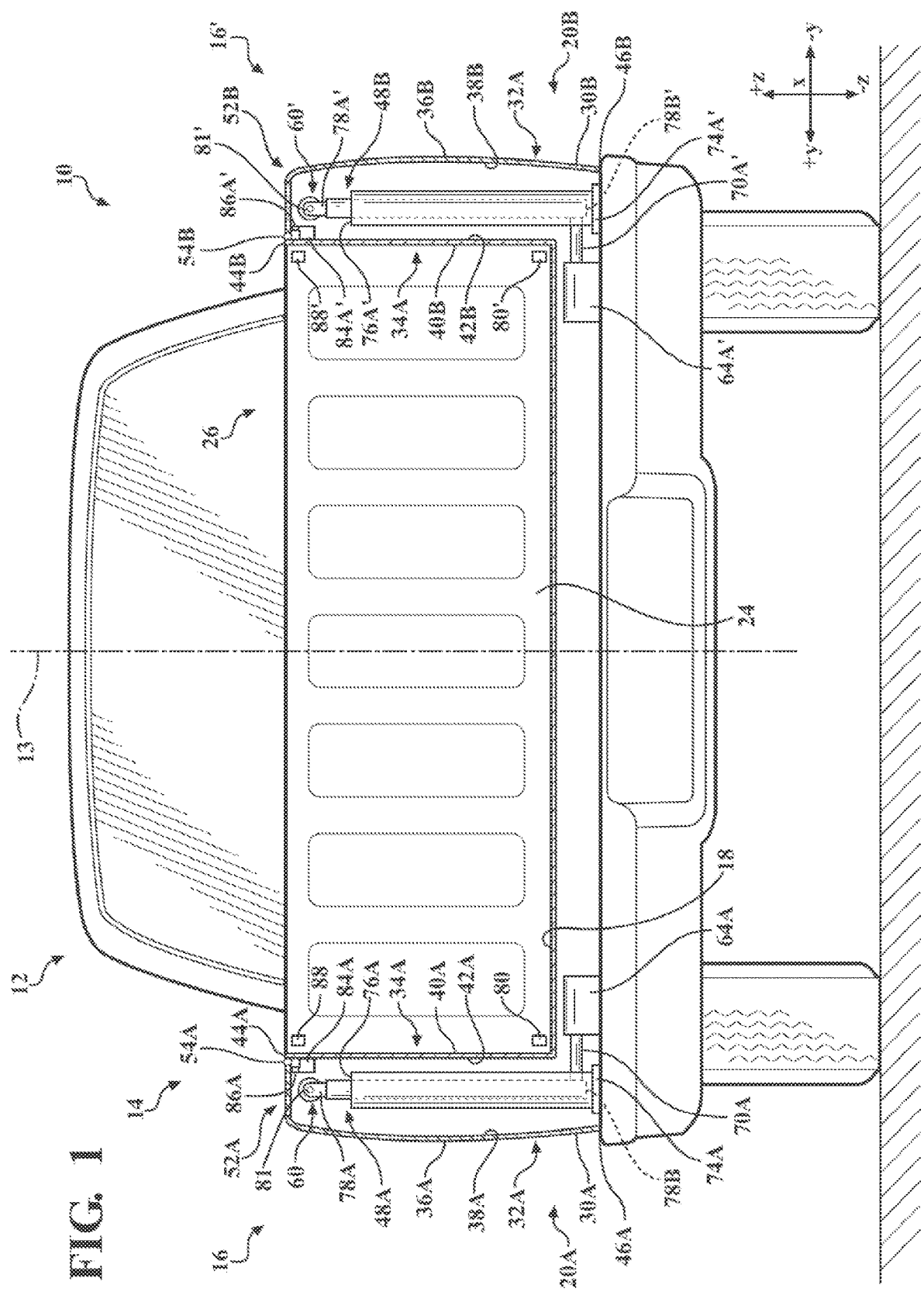
FIG. 1 schematically depicts a partial cross section of a rear view a pickup truck having a truck bed with a lid in a closed position and a retractable canopy assembly in a stored position, the retractable canopy assembly includes a lower leg, an extendable leg, a canopy, and a foldable leg, according to one or more embodiments described and illustrated herein.

As used herein, the term "vehicle longitudinal direction" refers to the forward-rearward direction of the pickup truck (i.e., in the +/−vehicle X direction depicted in FIG. 1). The term "vehicle lateral direction" refers to the cross-pickup truck direction (i.e., in the +/−vehicle Y direction depicted in FIG. 1), and is transverse to the vehicle longitudinal direction. The term "vehicle vertical direction" refers to the upward-downward direction of the pickup truck (i.e., in the +/−vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in direction with respect to a pickup truck centerline. The term "inboard" or "inward" as used herein refers to the relative location of a component in direction with respect to the pickup truck centerline. Because the pickup truck structures may be generally symmetrical about the pickup truck centerline, the direction to which use of terms "inboard," "inward," "outboard" and "outward" may be mirrored about the pickup truck centerline 13 when evaluating components positioned along opposite sides of the pickup truck 10.

Figure 2:
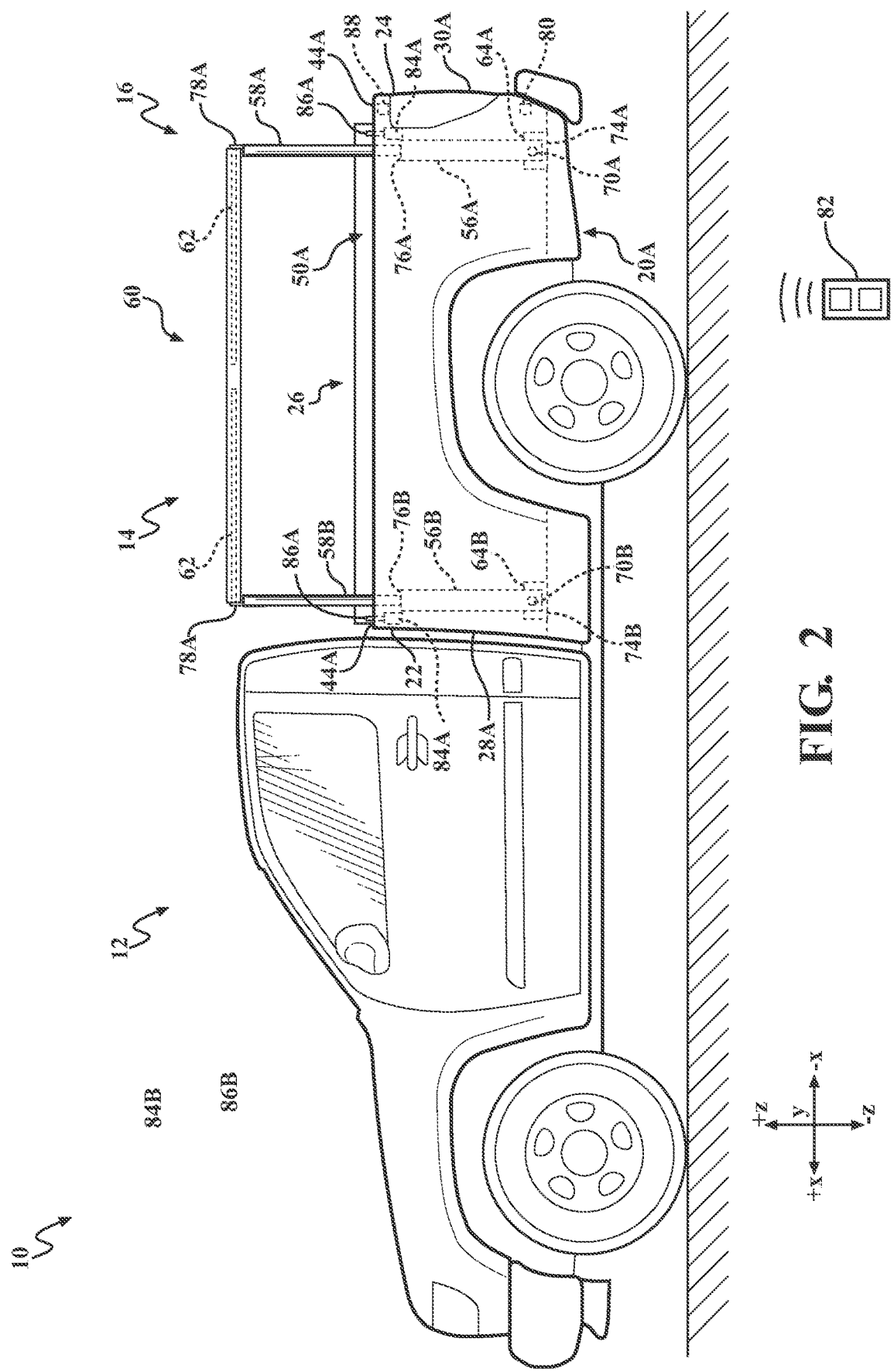
FIG. 2 schematically depicts a partial cross section of a side view of the pickup truck of FIG. 1 with the lid of the truck bed in an open position, the extendable leg in an extended position, the canopy in a rolled position and the foldable leg in a folded position, according to one or more embodiments described and illustrated herein.
Figure 3:
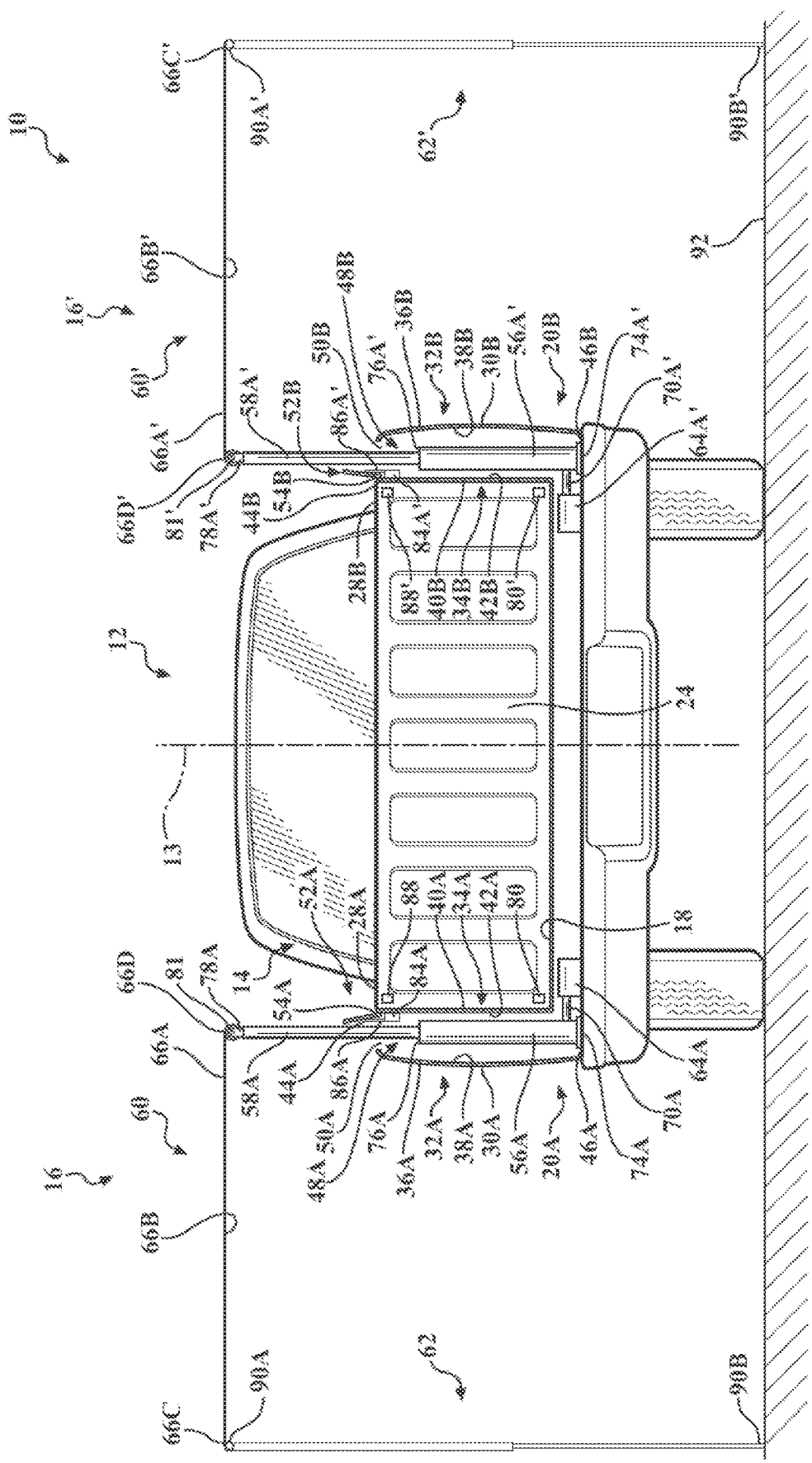
FIG. 3 schematically depicts a partial cross section of a rear view of the pickup truck of FIG. 1 with the retractable canopy assembly in a use position, the extendable leg in the extended position, the canopy in an unrolled position and the foldable leg in an unfolded position, according to one or more embodiments described and illustrated herein.

Referring initially to FIGS. 1-3, a pickup truck is generally illustrated at 10. The pickup truck 10 includes a passenger cabin 12, a truck bed 14, and a pair of retractable canopy assemblies 16, 16'. It should be appreciated that each retractable canopy assembly 16, 16' are a mirror image of each other with the retractable canopy assembly 16 being on a left side of the truck bed 14 and the retractable canopy assembly 16' being on the right side of the truck bed 14. As such, like reference numerals will be used to describe the features between the retractable canopy assembly 16 and the retractable canopy assembly 16' with the reference numeral of the retractable canopy assembly 16' further including a "'" identification.

The truck bed 14 includes a floor 18, a pair of spaced apart sidewalls 20A, 20B, a front wall 22, and a rear wall 24. The floor 18, the sidewalls 20A, 20B, the front wall 22, and the rear wall 24 define a storage area 26 of the truck bed 14. The sidewalls 20A, 20B extend parallel to the vehicle longitudinal direction. Each sidewall 20A, 20B includes a front end 28A, 28B and an opposite rear end 30A, 30B. The front wall 22 extends between the front ends 28A, 28B of the sidewalls 20A, 20B. The rear wall 24 extends between the rear ends 30A, 30B of the sidewalls 20A, 20B.

In some embodiments, it is appreciated, that the rear wall 24 is pivotally connected to the sidewalls 20A, 20B as a tailgate for movement between a closed position and an open position (not shown). In the closed position, the rear wall 24 extends parallel to the vehicle vertical direction. In the open position, the rear wall 24 extends parallel to the vehicle longitudinal direction.

Referring to FIGS. 1 and 3, the sidewalls 20A, 20B include an exterior wall 32A, 32B and an opposite interior wall 34A, 34B. The exterior walls 32A, 32B include an outer surface 36A, 36B and an opposite inner surface 38A, 38B. The interior walls 34A, 34B include an outer surface 40A, 40B and an opposite inner surface 42A, 42B. The inner surfaces 38A, 38B of the exterior walls 32A, 32B face the inner surfaces 42A, 42B of the interior walls 34A, 34B. The outer surfaces 36A, 36B of the exterior walls 32A, 32B face outwardly in the vehicle lateral direction. The outer surfaces 40A, 40B of the interior walls 34A, 34B face inwardly in the vehicle lateral direction and define a portion of the storage area 26 of the truck bed 14.

The sidewalls 20A, 20B include upper ends 44A, 44B and opposite lower ends 46A, 46B. The lower ends 46A, 46B are positioned closer to the floor 18 of the truck bed 14 than the upper ends 44A, 44B. The sidewalls 20A, 20B include elongated cavities 48A, 48B that are defined between the inner surfaces 38A, 38B of the exterior walls 32A, 32B and the inner surfaces 42A, 42B of the interior walls 34A, 34B. The elongated direction of the elongated cavities 48A, 48B extends parallel to the vehicle longitudinal direction. The elongated cavities 48A, 48B extend from the upper ends 44A, 44B towards the lower ends 46A, 46B of the sidewalls 20A, 20B. The upper ends 44A, 44B of the sidewalls 20A, 20B include elongated openings 50A, 50B that permit access to the elongated cavities 48A, 48B.

The upper ends 44A, 44B of the sidewalls 20A, 20B include lids 52A, 52B. The hinges 54A, 54B are positioned on an inward side in the vehicle lateral direction with respect to the elongated openings 50A, 50B. As will be described in greater detail below, the lids 52A, 52B are moveable between a closed position, as shown in FIG. 1 and an open position, as shown in FIGS. 2 and 3.

As shown in FIG. 1, the lids 52A, 52B are in the closed position such that the lids 52A, 52B extend outwardly in the vehicle lateral direction to cover the elongated openings 50A, 50B so as to inhibit access of the elongated cavities 48A, 48B from the elongated openings 50A, 50B. It is appreciated, of course, that the hinges 54A, 54B may be positioned on an outward side in the vehicle lateral direction with respect to the elongated openings 50A, 50B, and that in the closed position the lids 52A, 52B extend inwardly in the vehicle lateral direction to cover the elongated openings 50A, 50B so as to inhibit access of the elongated cavities 48A, 48B from the elongated openings 50A, 50B.

Further, as shown in FIG. 3, the lids 52A, 52B are in the open position such that the lids 52A, 52B extend upward in the vehicle vertical direction to uncover the elongated openings 50A, 50B so as to permit access of the elongated cavities 48A, 48B through the elongated openings 50A, 50B.

Referring to FIGS. 1-3, in embodiments, each of the lids 52A, 52B may be moved between the open and closed positions by lid actuators 84A, 84B. The lid actuators 84A, 84B include a lid actuator arm 86A, 86B. In some embodiments, the lid actuators 84A, 84B are positioned within the elongated cavities 48A, 48B. In other embodiments, the lid actuators 84A, 84B are positioned along the outer surface 40A, 40B of the interior walls 34A, 34B. The lid actuators 84A, 84B may be connected to the upper ends 44A, 44B of the sidewalls 20A, 20B. Each lid actuator arm 86A, 86B has one end connected to a portion of the lid 52A, 52B and an opposite end connected to the lid actuator 84A, 84B. The lid actuators 84A, 84B are optionally mechanical actuators, hydraulic actuators, pneumatic actuators, and/or electric actuators. In some embodiments, a pair of lid actuators 84A are provided within the elongated cavity 48A to move the lid 52A between the open position and the closed position and a pair of lid actuators 84B are provided within the elongated cavity 48B to move the lid 52B between the open position and the closed position.

The lid actuators 84A, 84B may be linear actuators that rotate the lid via the hinge 54A, 54B between the closed position and the open position upon movement of the lid actuator arm 86A, 86B from an unactuated state to an actuated state.

In some embodiments, the lid actuators 84A, 84B are actuated such that the lid actuator arms 86A, 86B are moved between the unactuated state and the actuated state by triggering an input switches 88A, 88B. The input switches 88A, 88B are electronically connected to the lid actuators 84A, 84B, by a wired or a wireless connection. In some embodiments, the input switches 88A, 88B are positioned on an exterior of the pickup truck 10. For example, the input switch 88A is optionally positioned on the exterior wall 32A of the sidewall 20A, the rear wall 24, the interior wall 34A of the sidewall 20A as shown in FIGS. 1-3, or the input switch 88A is positioned on the floor 18 of the truck bed 14. Further, the input switch 88B is optionally positioned on the exterior wall 32B of the sidewall 20B, the rear wall 24, the interior wall 34B of the sidewall 20B as shown in FIGS. 1-3, or the input switch 88B is positioned on the floor 18 of the truck bed 14. In some embodiments, a plurality of input switches 88 may be provided for the pickup truck 10 including in or on the truck bed 14 or in the passenger cabin 12.

It should be appreciated that, in some embodiments, the input switch 88A controls the retractable canopy assembly 16 and the input switch 88B controls the retractable canopy assembly 16'. That is, upon an actuation of the input switch 88A, the lid actuator 84A is actuated such that the lid actuator arm 86A is moved between the unactuated state and the actuated state and the lid 52A is moved between the closed position and the open position. Further, upon an actuation of the input switch 88B, the lid actuator 84B is actuated such that the lid actuator arm 86B is moved between the unactuated state and the actuated state and the lid 52B is moved between the closed position and the open position. In other embodiments, upon an actuation of either input switches 88A, 88B, the lid actuators 84A, 84B are actuated such that the lid actuator arms 86A, 86B are moved between the unactuated state and the actuated state and the lids 52A, 52B are moved between the closed position and the open position. In some other embodiments, the lid actuators 84A, 84B are actuated such that that the lid actuator arms 86A, 86B are moved between the unactuated state and the actuated state using a remote device 82. For example, the remote device 82 is optionally a key fob, a smartphone, or a mobile device. The remote device 82 transmits a wireless signal to actuate the lid actuators 84A, 84B, to move the lid actuator arms 86A, 86B between the unactuated state and the actuated state.

Still referring to FIGS. 1-3, the retractable canopy assembly 16 further includes a pair of lower legs 56A, 56B, a pair of extendable legs 58A, 58B, a canopy 60, a foldable leg 62, and a pair of actuators 64A, 64B, The canopy 60 includes a top (distal) surface 66A, an opposite bottom (proximate) surface 66B as well as a distal edge 66C and an opposite proximate edge 66D. The canopy 60 may be made of a flexible material, such as a woven or non-woven fabric, a plastic, and the like. As will be described in greater detail below, the canopy 60 is movable between a rolled position, as best shown in FIGS. 1 and 2, and an unrolled position, as best shown in FIG. 3. In the unrolled position, the canopy 60 is generally planar shape with a longitudinal direction that extends perpendicular with the vehicle longitudinal direction so to act as a sunshade. Further, in some embodiments, in the unrolled position, the canopy 60 is generally sized to extend outwardly 100%, 75%, 50% or less °±10% of the length of the truck bed 14 with respect to the distance between the interior wall 34A, 34B of the sidewalls 20A, 20B. Each lower leg 56A, 56B, may generally include a base portion 74A, 74B and an opening portion 76A, 76B opposite of the base portion 74A, 74B. In embodiments, the base portion 74A, 74B may be coupled to the floor 18. In other embodiments, the base portion 74A, 74B may be connected to the lower ends 46A, 46B of the sidewalls 20A, 20B. The opening portion 76A, 76B is positioned above the base portion 74A, 74B in the vehicle vertical direction such that each lower leg 56A, 56B extends within the elongated cavities 48A, 48B in the vehicle vertical direction. The opening portion 76A, 76B is positioned below the upper ends 44A, 44B in the system vertical direction. In some embodiments, each lower leg 56A, 56B may generally be cylindrical in shape. In other embodiments, each lower leg 56A, 56B may be a square shape, rectangular shape, hexagonal shape, and the like. As will be discussed in greater detail below, a distal end 78A of each lower leg 56A, 56B is in communication with the canopy 60 to raise the canopy 60 in the vehicle vertical direction and to support the canopy 60 at the truck bed 14.

The foldable leg 62 includes a distal portion 90A and an opposite proximate portion 90B. The foldable leg may be a rod, a shaft, and the like, that is capable of moving between a folded position, as best seen in FIG. 2 and an extended position, as best seen in FIG. 3. In some embodiments, the foldable leg 62 pivots from the folded position to the extended positon. As such, in this embodiment, the proximate portion 90A is coupled to the distal edge 66C of the canopy 60 while moving between the folded position and the extended position. In the unfolded position, the foldable leg 62 is extended between the canopy 60 and ground 92 to support the distal edge 66C of the canopy 60. That is distal portion 90A supports the distal edge 66C of the canopy and the proximate portion 90B is in contact with the ground 92. In some embodiments, the foldable leg 62 is a telescoping leg moving between a retracted position and an extended position.

Each of the pair of extendable legs 58A, 58B includes a distal end 78A and an opposite proximate end 78B. Each of the pair of extendable legs 58A, 58B extend from each respective lower leg 56A, 56B in the vehicle vertical direction. That is, in some embodiments, at least a portion of the extendable legs 58A, 58B are positioned within the respective lower leg 56A, 56B via the opening portion 76A. In some embodiments, the proximate end 78B of the extendable legs 58A, 58B is positioned within and slidably engages with a portion of the lower legs 56A, 56B. The distal end 78A of each extendable leg 58A, 58B is generally positioned above the opening portion 76A of each respective lower leg 56A, 56B in the vehicle vertical direction. As will be described in greater detail below, each extendable leg 58A, 58B moves linearly between a retracted position, as best seen in FIG. 1, and an extended position, as best seen in FIGS. 2-3. As such, in some embodiments, the extendable legs are telescoping legs that are linearly displaced in the lower leg.

In some embodiments, the canopy 60 includes a roller 81 is rotatable coupled to the distal end 78A of the extendable legs 58A, 58B such that the roller 81 rotates, with respect to the extendable legs 58A, 58B. The roller 81 extends parallel with the vehicle longitudinal direction. As such, the canopy 60 is rolled or unrolled around the roller 81. It should be appreciated that the canopy 60 and the roller 81 may be a retractable sunshade. In some embodiments, the foldable leg 62 is positioned between at the distal edge 66C of the canopy 60 such that the foldable leg 62 is contained within the canopy in the rolled position and the foldable leg 62 is in the folded position and is easily accessible when the canopy 60 is in the unrolled position.

The actuators 64A, 64B include an actuator arm 70A, 70B. In some embodiments, the actuators 64A, 64B are positioned within the elongated cavities 48A, 48B. In other embodiments, the actuators 64A, 64B are positioned beneath the floor 18 of the truck bed 14 in the vehicle vertical direction. The actuators 64A, 64B may be connected to the lower ends 46A, 46B of the sidewalls 20A, 20B. Each actuator arm 70A, 70B has one end connected to proximate end of the extendable legs and an opposite end connected to the actuator 64A, 64B. The actuators 64A, 64B are optionally mechanical actuators, hydraulic actuators, pneumatic actuators, and/or electric actuators.

The actuators 64A, 64B may be rotatable actuators that linearly displace the extendable legs 58A, 58B, in the vehicle vertical direction, between the retracted position and an extended position upon movement of the actuator arm 70A, 70B from an unactuated state to an actuated state.

In some embodiments, the actuators 64A, 64B are actuated such that the actuator arms 70A, 70B are moved between the unactuated state and the actuated state by triggering an input switch 80. The input switch 80 is electronically connected to the actuators 64A, 64B by a wired or a wireless connection. In some embodiments, the input switch 80 is positioned on an exterior of the pickup truck 10. For example, the input switch 80 is optionally positioned on the exterior wall 32A of the sidewall 20A, the rear wall 24, the interior wall 34B of the sidewall 20B as shown in FIGS. 1-3, or the input switch 80 is positioned on the floor 18 of the truck bed 14. In some embodiments, a plurality of input switches 80 may be provided for the pickup truck 10 including in or on the truck bed 14 or in the passenger cabin 12.

It should be appreciated that, in some embodiments, the input switches 80, 80', 88A, 88B may actuate the actuators 64A, 64B and lid actuators 84A, 84B to move the retractable canopy assembly 16 between the stored position and the use position. That is, in some embodiments, upon an actuation of and the input switches 80, 80', 88A, 88B 88B, the actuators 64A, 64B and lid actuators 84A, 84B may cause the various components described herein to move between the use position and the stored position and/or from the stored position to the use position, as described in greater detail below.

In some other embodiments, the actuators 64A, 64B are actuated such that that the actuator arms 70A, 70B are moved between the unactuated state and the actuated state using the remote device 82. For example, the remote device 82 is optionally a key fob, a smartphone, or a mobile device. The remote device 82 transmits a wireless signal to actuate the actuators 64A, 64B to move the actuator arms 70A, 70B between the unactuated state and the actuated state.

Referring to FIG. 1, the canopy 60, the foldable leg 62, and the extendable legs 58A, 58B are positioned within the elongated cavities 48A, 48B when the actuator arms 70A, 70B are in the unactuated state such that the retractable canopy assembly 16 is in a stored position. Specifically, the canopy 60, the foldable leg 62, and the extendable legs 58A, 58B are all positioned such that they are stored below the upper end 44A, 44B of the sidewalls 20A, 20B. As the retractable canopy assembly 16 (i.e., the canopy 60, the foldable leg 62, and the extendable legs 58A, 58B) is in the stored position below the upper ends 44A, 44B of the sidewalls 20A, 20B, the lids 52A, 52B are in the closed position.

Referring to FIG. 2, the extendable legs 58A, 58B are in the extended position and the actuator arms 70A, 70B are in the actuated state. It should be appreciated that the actuators 64A, 64B may move in tandem such that the extendable legs 58A, 58B move between the retracted position and the extended position together. In the extended position, the extendable legs 58A, 58B are positioned so as to extend at least partially outside or beyond the elongated cavities 48A, 48B. The extendable legs 58A, 58B are positioned such that the distal end 78A are positioned above the upper end 44A, 44B of the sidewalls 20A, 20B. As the extendable legs 58A, 58B are in the extended position with the distal end 78A positioned above the upper ends 44A, 44B of the sidewalls 20A, 20B, the lids 52A, 52B are in the open position. The foldable leg 62 is still in the folded positon and the canopy 60 is still in the rolled positon with the foldable leg 62 positioned at the distal edge 66C of the canopy 60 such that the retractable canopy assembly 16 is in an intermediate position between the stored position and the use position.

As discussed above, the actuation of the actuator arms 70A, 70B from the unactuated state to the actuated state linearly displaces the extendable legs 58A, 58B from the retracted position towards the extended position. Further, in some embodiments, the lid actuators 84A, 84B move the lids from the closed position to the open positon before the actuators 64A, 64B move the extendable legs 58A, 58B from the retracted position to the extended position. In other embodiments, the movement of the extendable legs 58A, 58B from the retracted position to the extended position also moves the lids 52A, 52B from the closed position to the open position as the distal end 78A of the extendable legs 58A, 58B contact the lids 52A, 52B which are rotated about the hinges 54A, 54B to the open position. As such, it should be appreciated that in order to deploy the retractable canopy assembly 16 from the stored position to the deployed position, each respective lid 52A, 52B is moved from the closed position to the open position. It should be appreciated that the lid actuators 84A, 84B move independent from one another to move each lid 52A, 52B from the closed position to the open positon.

Now referring to FIG. 3, the retractable canopy assembly 16 is schematically depicted in the use position. In particular, the respective lid 52A, 52B is in the open position, the extendable legs 58A, 58B are in the extended position, the canopy 60 is in the unrolled positon and the foldable leg 62 is in the unfolded positon. In the unrolled position, the canopy 60 is unrolled to extend outwardly in the vehicle lateral direction from the extendable legs 58A, 58B and the truck bed 14 beyond the outer surface 36A, 36B of the exterior walls 32A, 32B. In the unfolded position, the foldable leg 62 is extended between the canopy 60 and the ground 92 to support the distal edge 66C of the canopy 60. It should be appreciated that the canopy 60 may be coplanar with the ground 92 or obliquely or acutely angled with respect to the ground 92.

As such, it should be appreciated that the canopy 60 is supported by the foldable leg 62 and the extendable legs 58A, 58B into a position that is above the upper ends 44A, 44B of the sidewalls 20A, 20B in the vehicle vertical direction and extends outwardly beyond the outer surface 36A, 36B of the exterior walls 32A, 32B of the respective sidewalls 20A, 20B. As such, this arrangement provides for shade in areas adjacent to the truck bed 14. That is, this arrangement provides for shade, protection from the weather, and the like in areas that are beyond the outer surface 36A, 36B of the exterior walls 32A, 32B of the respective sidewalls 20A, 20B of the truck bed 14. Further, this arrangement requires less space to position the canopy since the proximate edge 66D is supported by the extendable legs 58A, 58B positioned extending through the sidewalls 20A, 20B of the truck bed 14 and the distal edge 66C of the canopy 60 is supported by the foldable leg 62.

It should be appreciated that the retractable canopy assembly 16 and the retractable canopy assembly 16' may be independently operable. That is, the retractable canopy assembly 16 may be in the use portion while the retractable canopy assembly 16' is in the storage position, or vice versa.

Further, both the retractable canopy assembly 16 and the retractable canopy assembly 16' may be in the storage positon simultaneously, in the use position simultaneously, or a plurality of positions there between simultaneously.

It should be appreciated that the retractable canopy assembly is integrated with the truck bed eliminating the need for remote storage, reducing the time and space needed to erect the retractable canopy assembly, and when erected, less space is needed.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A canopy assembly comprising:
   a truck bed that includes a floor and a pair of spaced apart sidewalls, each of the pair of sidewalls includes an exterior wall, an opposite interior wall, and an elongated cavity positioned between the exterior wall and the interior wall of each of the pair of sidewalls; and
   a pair of retractable canopies that are movable between a stored position and a use position, in the stored position each of the retractable canopies are positioned within the elongated cavity defined in each of the pair of sidewalls, and in the use position each of the pair of retractable canopies are positioned to extend at least partially outside of the elongated cavity of each of the pair of sidewalls and extend beyond the exterior wall of the respective sidewalls in a vehicle lateral direction.

2. The canopy assembly of claim 1, wherein each of the pair of retractable canopies further comprise:
   a pair of lower legs that include a base portion and an opening portion, the base portion is coupled to the floor of the truck bed and is positioned within the elongated cavity.

3. The canopy assembly of claim 2, wherein each of the pair of retractable canopies further comprise:
   a pair of extendable legs that are each linearly movable in a vehicle vertical direction between a retracted position within the elongated cavity and an extended position to extend beyond the elongated cavity.

4. The canopy assembly of claim 3, wherein each of the pair of extendable legs are received in the respective opening portion of the pair of lower legs to telescope from the opening portion of the pair of lower legs in the extended position.

5. The canopy assembly of claim 3 further comprising an actuator connected to each of the pair of extendable legs, the actuator is actuated to move each of the pair of extendable legs between the retracted position and the extended position.

6. The canopy assembly of claim 3, wherein each of the pair of retractable canopies further comprise:
   a canopy coupled to a distal end of each of the pair of extendable legs, the canopy is movable between a rolled position and an unrolled position.

7. The canopy assembly of claim 6, wherein in the unrolled position, the canopy extends outwardly from the distal end of the pair of extendable legs and the truck bed in a vehicle lateral direction.

8. The canopy assembly of claim 6, wherein each of pair of the retractable canopies further comprise:
   a foldable leg having a first end and a second end, the first end is coupled to a distal edge of the canopy, the foldable leg is movable in the vehicle vertical direction between a folded position and an extended position such that in the extended position, the second end is in contact with a surface other than the truck bed to support the distal edge of the canopy.

9. The canopy assembly of claim 8, wherein in the rolled position of the canopy, the foldable leg is coupled to the distal edge of the canopy in the folded position.

10. The canopy assembly of claim 8, wherein the pair of lower legs, the pair of extendable legs, the canopy and the foldable leg are each provided within the elongated cavity defined in each of the pair of sidewalls when each of the retractable canopies are in the stored position.

11. The canopy assembly of claim 2, wherein in the use position, the pair of lower legs are each positioned below an upper end of the pair of sidewalls in a vehicle vertical direction.

12. The canopy assembly of claim 1, further comprising:
   a lid coupled to an upper end of each of the pair of sidewalls, each lid is movable between an open position and a closed position such that in the open positon access is permitted to the elongated cavity positioned between the exterior wall and the interior wall of each of the pair of sidewalls and in the closed positon access is prohibited to the elongated cavity.

13. The canopy assembly of claim 12 further comprising an actuator connected to each lid, the actuator is actuated to move each lid between the closed position and the open position.

* * * * *

UNITED STATES PATENT AND TRADEMARK OFFICE
CERTIFICATE OF CORRECTION

PATENT NO. : 11,370,495 B2
APPLICATION NO. : 16/811807
DATED : June 28, 2022
INVENTOR(S) : Ruben Ramirez, Jr.

Page 1 of 1

It is certified that error appears in the above-identified patent and that said Letters Patent is hereby corrected as shown below:

On the Title Page

Under item (56), Assistant examiner, delete "Neronica Marie Shull" and insert --Veronica Marie Shull--, therefor.

In the Specification

In Column 5, Line(s) 43, after "64B", delete "," and insert --.--, therefor.
In Column 6, Line(s) 18, delete "positon" and insert --position--, therefor.
In Column 7, Line(s) 31, after "88A, 88B" delete "88B".
In Column 8, Line(s) 5, delete "positon" and insert --position--, therefor.
In Column 8, Line(s) 6, delete "positon" and insert --position--, therefor.
In Column 8, Line(s) 15, delete "positon" and insert --position--, therefor.
In Column 8, Line(s) 30, delete "positon" and insert --position--, therefor.
In Column 8, Line(s) 35, delete "positon" and insert --position--, therefor.
In Column 8, Line(s) 36, delete "positon" and insert --position--, therefor.
In Column 9, Line(s) 3, delete "positon" and insert --position--, therefor.

In the Claims

In Column 10, Line(s) 1, Claim 5, after "claim 3", insert --,--.
In Column 10, Line(s) 41, Claim 12, delete "positon" and insert --position--, therefor.
In Column 10, Line(s) 44, Claim 12, delete "positon" and insert --position--, therefor.
In Column 10, Line(s) 46, Claim 13, after "claim 12", insert --,--.

Signed and Sealed this
Sixth Day of December, 2022

Katherine Kelly Vidal
*Director of the United States Patent and Trademark Office*